Inventor:
Hansjoerg Stern,
by Roe D McBurnett
His Attorney.

United States Patent Office 2,958,295
Patented Nov. 1, 1960

2,958,295

HYDRAULIC UNIT HAVING STROKING FORCE COMPENSATION

Hansjoerg Stern, Schenectady, N.Y., assignor to General Electric Company, a corporation of New York Filed Oct. 1, 1956, Ser. No. 613,081

5 Claims. (Cl. 103—161)

The present invention relates to a radial-piston positive displacement hydraulic unit, and more particularly to a radial-piston positive displacement hydraulic unit having stroking force compensation.

A radial-piston positive displacement hydraulic unit, such as a ball pump, varies in displacement by the eccentric movement of a stroking raceway relative to a rotating cylinder block containing a plurality of reciprocating balls or rods. Thus, in following the raceway the balls move in and out with respect to their coacting cylinders. Hence, the displacement of the hydraulic unit may be controlled by varying the eccentricity of the raceway with respect to the cylinder block which is rotatably mounted on a pintle member containing a number of pintle ports for porting fluid under working pressure to and from the block cylinder. Hereinafter, the working pressure is defined as that pressure generated by the hydraulic unit operating as a pump or the pressure supplied to the unit when operating as a motor. This process of varying the eccentricity of the raceway relative to the cylinder block is called stroking, and for a more detailed explanation of this process, reference may be made to Serial Number 422,193, by Tord Dannevig, filed April 9, 1954, and assigned to the same assignee as the present application.

In stroking the raceway of a radial-piston type hydraulic unit, a component force which is a function of the degree of stroking and the working pressure will be produced which counteracts the imposed displacement of the raceway by an external stroking force from its concentric attitude with the cylinder block. This component force, which is the reaction of the pistons on the raceway in the direction of stroking and a function of the pressure at the pintle ports reacting against the pistons, is proportional in magnitude to the working pressure and the degree of stroking. That portion of the external stroking force needed to overcome this variable component force is hereinafter termed the stroking effort; and which is that portion of the external stroking force that the present invention substantially eliminates, as hereinafter disclosed.

Generally, the external stroking force for stroking the raceway is of such magnitude as to preclude the use of direct electrical means, such as solenoids or torque motors. Solenoids, and the like, possessing adequate force would have to be extremely large and the added inertia of large armatures would, of course, retard the response time of the system. Also, hydraulic means commonly utilized in conventional stroking mechanisms must have such a large output for stroking that the time response element in a hydraulic system is so increased as to appreciably reduce the performance characteristics of the system.

The present invention reduces the required external stroking force by substantially eliminating the stroking effort through the utilization of a number of oppositely disposed and coacting hydraulic pistons each having a fixed length leakage passage and a variable length leakage passage, coupled thereto so that raceway travel away from the center of the unit will produce a pressure differential across the two pistons. This pressure differential is a result of the change in the flow through the variable length leakage passages and the resultant change in pressure reacting against the hydraulic pistons, and serves to produce a negative force substantially reducing the required stroking effort. In this manner, the stroking effort is reduced or effectively overcome so that the external stroking force required for the stroking of a hydraulic unit utilizing the principles of this invention will only be that which is required to overcome such forces as inertia, friction, and the like.

Accordingly, the complexity and size of the stroking mechanism is greatly reduced and the stroking effort compensated by a simple hydraulic mechanism responsive to the working pressure and stroking conditions of the unit. Thus, the present invention substantially overcomes the requirement for the stroking effort at all conditions of working pressure and stroke of the hydraulic unit. Hence, the present invention overcomes the disadvantages of most conventional stroking effort compensating devices which utilize external biasing devices to add an imposed force to the stroking raceway. This imposed force is opposite to the direction of the external stroking force and equal in magnitude to the stroking effort at one discrete stroking value, and, further, varies only with the working pressure and not with the degree of stroking.

In addition, the stroking effort compensating means of the present invention will not require substantially more space than that needed for the conventional stroking pistons and, further, can be used in parallel therewith, as disclosed hereinafter. The present invention is temperature independent since the resistances of the various leakage passages remain in a given relation and, hence, a change in viscosity can only change the flow and not the pressure relationship therebetween. The fixed and variable length leakage passages, since they include moving parts, are self-cleaning and can be designed to be of such clearance that matching tolerances for the moving parts are of minor importance. In this manner the normal clearances between the hydraulic pistons and their mounting structures will furnish the necessary leakage passage resistances. Consequently, since the external stroking force is substantially reduced by the substantial reduction or elimination of the stroking effort, only small stroking pistons are needed or, if desired, electrical stroking of the units becomes feasible.

An object of the present invention is the provision of a new and improved hydraulic unit having stroking force compensation.

Another object is to provide a compensating mechanism for a stroking raceway in a radial piston positive displacement hydraulic unit so as to substantially overcome the stroking effort at all pressure and stroking conditions.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
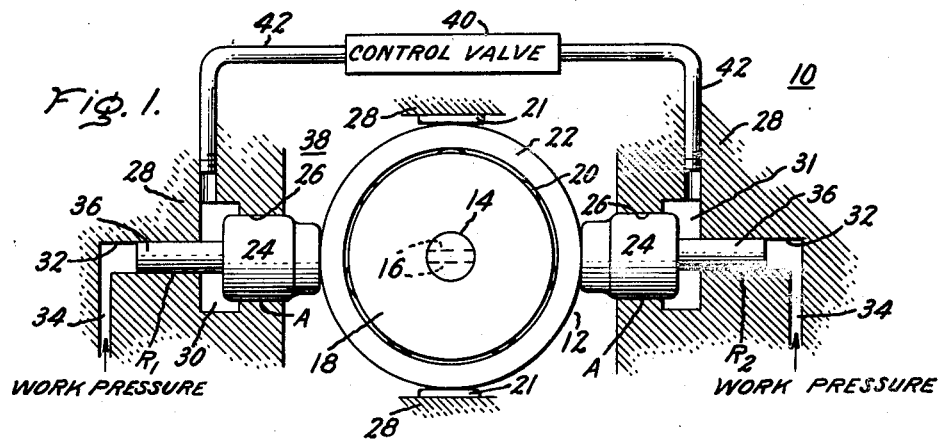
Figure 1 is a cross-sectional view of a preferred embodiment of the present invention at zero stroke.

Referring now to the drawings, there is shown in Figure 1 a preferred embodiment 10 illustrating, in simplified form, a single lobe ball piston hydraulic unit 12 comprising a stationary pintle 14 formed with a number of pintle ports 16 which operatively coact with a cylinder block 18 rotatably mounted on the pintle. The cylinder block is formed with a plurality of radial piston bores, not shown, wherein each bore is provided with a ball piston 20 radially movable therein.

The balls 20 are in rolling contact with the inner peripheral wall of a stroking raceway 22 supported by guide pads 21 for reciprocal horizontal movement relative to the cylinder block 18. Stroking means coacting with the stroking raceway 22 are provided and preferably comprise a pair of oppositely coacting pistons 24 in continuous contact at diametrically opposed peripheral points with the stroking raceway.

The pistons 24 are each slideably mounted within a corresponding bore 26 formed within a housing 28, partially shown, enclosing the single lobe ball hydraulic unit 12. The housing is provided with a pair of pressure cavities 30 and 31 each being coaxial and juxtaposed with one of the bores 26 and with a housing sleeve 32 opening therein. Each of the sleeves 32 is connected to inlet conduits 34 so as to be respectively coupled to the working pressure of the system.

Each stroking piston 24 is formed with a coaxial shaft extension 36 slideably coacting with its respective housing sleeve 32. Also, the circumferential surfaces of the shaft extensions 36 are spaced a predetermined amount from the interior surface of their coacting housing sleeve to provide sufficient radial space therebetween to form leakage passages, $R_1$ and $R_2$, which vary in length with the stroking and are coupled to the inlet conduits 34 and to cavities 30 and 31, respectively. Further, the coaction of the pistons 24 with their respective bore 26 is such that even with normal tolerances a continuous leakage is provided between the cavities 30 and 31 with the interior 38 of the housing 28 to thereby provide fixed length leakage passages "A" therebetween. In other words, the leakage passages A form restrictive passages through which the hydraulic fluid supplied to the cavities 30 and 31 must flow, and the resistance to fluid flow of the restrictive passages A remains fixed with movement of the pistons 24 because the length of the passages remains constant with movement of the pistons. On the other hand, the resistance to fluid flow of the restrictive passages $R_1$ and $R_2$ varies with movement of the pistons 24 because the lengths of the extension shafts 36 engaging the bores 32 to form these passages varies with movement of the pistons. The pressure cavities 30 and 31 are connected to a control valve 40 through respective conduits 42. The valve is conventionally coupled to a control device, not shown, supplying control signals in the form of hydraulic flow to the stroking pistons 24 for controlling the operation of the single lobe ball hydraulic unit 12 at a predetermined or rated value of output flow or torque.

Figure 2:
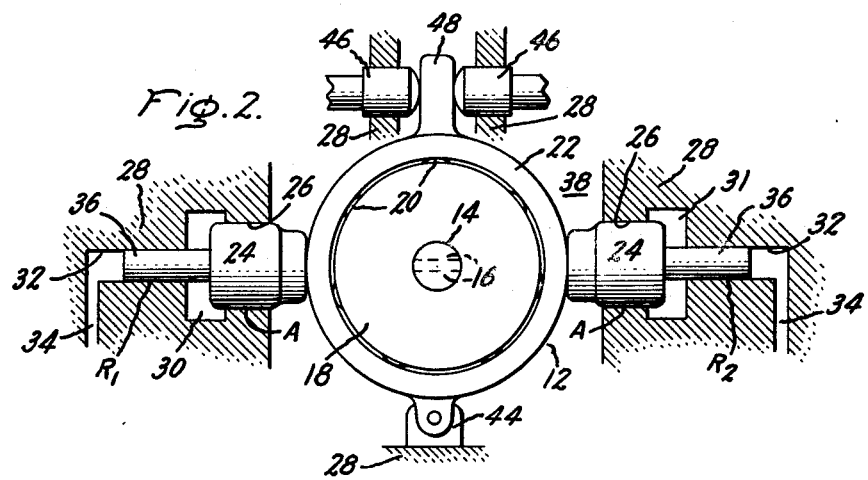
Figure 2 is a cross-sectional view of a modification of the preferred embodiment, illustrating a mechanical stroking device.

Figure 2 illustrates a modification of the preferred embodiment 10, wherein the stroking within the hydraulic unit 12 is provided by mechanical or electrical actuators 46, such as a solenoid, and the like, coacting with an extension 48 integrally formed on the stroking raceway 22. The raceway 22 is mounted on a housing pivot member 44 so as to obtain suitable movement of the raceway in the stroking thereof. The remaining structural arrangement of the modification of Figure 2, relative to the compensating means, is similar to that of the preferred embodiment 10 so that further description thereof is not presently required.

In the operation of the preferred embodiment 10, for the centered position of the raceway 22, as shown in Figure 1, the pressure on each piston 24 is equal, therefore, their net force on the raceway is zero and, under the same conditions, the component force is zero. For a stroke position to the left of center, the component force acts to the right and since the leakage passage $R_1$ is now longer than $R_2$, greater pressure will be produced within the cavity 31. Hence, the pressure within the cavity 30 reacting on the piston 24, juxtaposed thereto, is less than that on the other piston, juxtaposed to the cavity 31 and the leakage passage $R_2$, and a negative or compensating force acts to the left to substantially overcome or eliminate the component force. It can be seen that whenever the working pressure and/or the stroking of the raceway 22 vary, the component force will change therewith and the compensating force, substantially replacing or eliminating the requirement for a stroking effort, will similarly change. Thus, it can be seen that the actual degree of compensation that can be achieved will depend on the values of the clearance, length and diameters of leakage passages $R_1$, $R_2$, and on the structural dimensions of each of the pistons 24.

Figure 3:
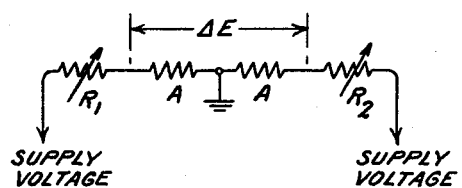
Figure 3 is an electrical circuit diagram illustrating the principles of the present invention so as to facilitate disclosure thereof.

The stroking mechanism provided in the preferred embodiment 10, is used in parallel with the compensating mechanism of leakage passages $R_1$ and $R_2$ and the fixed leakage passages A. Thus, as seen from Figure 3, the compensation for the stroking effort would be analogous to an electrical system wherein the supply voltage corresponds to the working pressure entering through the inlet conduits 34. The voltage $\Delta E$ corresponds to the pressure differential across the pistons 24, while $R_1$ and $R_2$ are the variable leakage passages and A the fixed leakage passages.

Figure 4:
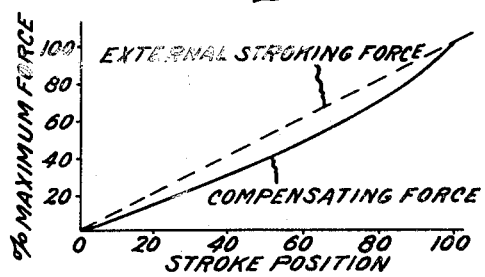
Figure 4 is a graphic plot of the stroking effort compensation available for a typical installation, such as the preferred embodiment of Figure 1, for various degrees of stroking with its corresponding compensation in percentages of the maximum external stroking force.

Figure 4 shows a plot of the compensating force available for the hydraulic unit 12 of Figure 1 wherein a single lobe 5/16 inch ball piston hydraulic unit and a 3/8 inch in diameter piston 24 are associated with variable length leakage passages $R_1$ and $R_2$ and fixed leakage passages A which are not longer than the stroking length available for a conventional hydraulic stroking mechanism. Consequently, with the present invention, as seen in Figure 4, a compensating force to within approximately 99% of the external stroking force can be achieved, so that the requirement for a stroking effort is substantially eliminated.

It should be understood, of course, that the foregoing disclosure relates to only a preferred embodiment of the invention and that it is intended to cover all changes and modifications of the examples of the invention herein chosen for the purpose of the disclosure, which do not constitute departures from the spirit and scope of the invention as set forth in the appended claims.

What is claimed is:

1. A stroking force compensator for a radial piston hydraulic unit comprising a stroking raceway, a housing enclosing said raceway, a pair of diametrically opposed pistons slideably mounted in said housing and continuously biasing said stroking raceway, a fixed length leakage passage formed by the structural coaction of each of said pistons within its mounting, conduit means extending between each of said pistons and the working pressure of the hydraulic unit, and shaft means extending from each of said pistons into said conduit means to form by coaction with said conduit means a variable length leakage passage extending between each piston and the working pressure of the hydraulic unit so that any displacement of said stroking raceway away from its center produces a pressure differential across said pistons proportional to the displacement of the stroking raceway from its center.

2. A stroking force compensator for a radial ball hydraulic unit comprising an adjustable stroking raceway, a housing enclosing said raceway and having coaxial bores formed therein, piston means slideably mounted within each of said piston bores so as to form fixed length leakage passages therebetween, and shaft means extending from said pistons into sleeves in said housing to form variable length leakage passages, said variable length leakage passages having fluid passing therethrough at the working pressure of the unit so as to coact with said piston means in response to the displacement of said raceway from its center and thereby affect relative movement between said piston means to compensate for a substantial portion of the external stroking force.

3. In a variable displacement hydraulic unit having a stroking raceway, a stroking force compensator comprising pressure actuated biasing means connected to said stroking raceway, conduit means extending between said biasing means and a source of fluid pressure, a first restrictive passage situated in said conduit means between said biasing means and said fluid pressure source, means for adjusting the resistance to fluid flow of said first restrictive passage, a second restrictive passage located downstream of said biasing means and in series flow relation to said first restrictive passage, means interconnecting said biasing means and said resistance adjusting means to adjust the resistance to fluid flow of said first restrictive passage with movement of said biasing means, and means limiting the variations in the resistance to fluid flow of said second passage to a lesser magnitude than the simultaneous variations in the same direction of the resistance to fluid flow of said first passage, whereby the pressure drop across said first restrictive passage and the resulting pressure to said biasing means are automatically adjusted with displacement of said stroking raceway and said biasing means.

4. In a variable displacement hydraulic unit having a stroking raceway, a stroking force compensator comprising first and second restrictive passages connected in series with each other and connectible to a source of fluid under pressure, the resistance to fluid flow of said first passage being fixed and the resistance to fluid flow of said second passage being adjustable, whereby the fluid pressure at a point intermediate said passages may be varied by adjusting the resistance to fluid flow of said second passage, means interconnecting said stroking raceway and said resistance adjusting means whereby the magnitude of the fluid pressure intermediate said passages is adjusted with movement of said stroking raceway, and means connecting said biasing means to said intermediate fluid pressure at a point intermediate said passages whereby the force exerted on said stroking raceway by said biasing means is automatically adjusted with displacement of said stroking raceway.

5. In a variable displacement hydraulic unit having a component of force opposing stroking therein, stroking means adapted to vary the displacement of the unit, a pair of coacting pistons mounted in cylindrical bores in said unit and operatively coupled to said stroking means, each of said cylindrical bores being cut away such that the axial length of the surface of each bore is less than the axial length of the coacting surface of the piston mounted therein, whereby the lengths of the leakage passages formed between said pistons and said bores remain fixed with axial movement of said pistons, conduit means extending between each of said bores and a source of fluid pressure, and shaft means extending from each of said pistons into said conduit means to form by coaction with said conduit means leakage passages which are variable in length with displacement of said pistons, whereby the fluid pressure on said pistons is controlled as a function of the displacement of said pistons and said stroking means.

References Cited in the file of this patent

UNITED STATES PATENTS

| | | |
|---|---|---|
| 2,309,148 | Wilson et al. | Jan. 26, 1943 |
| 2,386,459 | Hautzenroeder | Oct. 9, 1945 |
| 2,453,538 | Rauch | Nov. 9, 1948 |
| 2,502,546 | Adams | Apr. 4, 1950 |
| 2,678,607 | Hufferd et al. | May 18, 1954 |